United States Patent
Singh et al.

(10) Patent No.: US 10,269,356 B2
(45) Date of Patent: Apr. 23, 2019

(54) SYSTEMS AND METHODS FOR ESTIMATING AGE OF A SPEAKER BASED ON SPEECH

(71) Applicant: Disney Enterprises, Inc., Burbank, CA (US)

(72) Inventors: Rita Singh, Pittsburgh, PA (US); Jill Fain Lehman, Pittsburgh, PA (US)

(73) Assignee: Disney Enterprises, Inc., Burbank, CA (US)

(*) Notice: Subject to any disclaimer, the term of this patent is extended or adjusted under 35 U.S.C. 154(b) by 263 days.

(21) Appl. No.: 15/243,635

(22) Filed: Aug. 22, 2016

(65) Prior Publication Data
US 2018/0053514 A1 Feb. 22, 2018

(51) Int. Cl.
*G10L 15/00* (2013.01)
*G10L 17/26* (2013.01)
*G10L 25/51* (2013.01)
*G10L 15/02* (2006.01)
*G10L 25/15* (2013.01)
*G10L 17/02* (2013.01)
(Continued)

(52) U.S. Cl.
CPC .......... *G10L 17/26* (2013.01); *G10L 15/02* (2013.01); *G10L 25/15* (2013.01); *G10L 25/51* (2013.01); *G10L 15/08* (2013.01); *G10L 15/10* (2013.01); *G10L 17/02* (2013.01)

(58) Field of Classification Search
CPC ....... G10L 17/005; G10L 17/02; G10L 15/07; G10L 15/20; G10L 15/22; G10L 15/30; G10L 15/02; G10L 15/08; G10L 15/00; G10L 15/10; G10L 15/12; G10L 2015/0631; G10L 15/142; G10L 17/06; G06F 3/16; H05K 999/99

USPC .................................................. 704/200, 246
See application file for complete search history.

(56) References Cited

U.S. PATENT DOCUMENTS

| | | | | |
|---|---|---|---|---|
| 2005/0228664 A1* | 10/2005 | Zhao | ...................... | G10L 15/02 704/245 |
| 2008/0298562 A1* | 12/2008 | Ju | .......................... | G10L 15/005 379/88.18 |
| 2015/0351663 A1* | 12/2015 | Zigel | .................... | A61B 5/4803 600/586 |

OTHER PUBLICATIONS

T. Ganchev, I. Mporas, and N. Fakotakis, "Automatic height estimation from speech in real-world setup," in Proc. of the 18th European Signal Processing Conf, 2010, pp. 800-804.
(Continued)

*Primary Examiner* — Vu B Hang
(74) *Attorney, Agent, or Firm* — Farjami & Farjami LLP

(57) ABSTRACT

There is provided a system comprising a microphone, configured to receive an input speech from an individual, an analog-to-digital (A/D) converter to convert the input speech to digital form and generate a digitized speech, a memory storing an executable code and an age estimation database, a hardware processor executing the executable code to receive the digitized speech, identify a plurality of boundaries in the digitized speech delineating a plurality of phonemes in the digitized speech, extract a plurality of formant-based feature vectors from each phoneme in the digitized speech based on at least one of a formant position, a formant bandwidth, and a formant dispersion, compare the plurality of formant-based feature vectors with age determinant formant-based feature vectors of the age estimation database, determine the age of the individual when the comparison finds a match in the age estimation database, and communicate an age-appropriate response to the individual.

18 Claims, 5 Drawing Sheets

(51) Int. Cl.
    *G10L 15/08*     (2006.01)
    *G10L 15/10*     (2006.01)

(56) References Cited

OTHER PUBLICATIONS

I. Mporas and T. Ganchev, "Estimation of unknown speaker's height from speech," International Journal of Speech Technology, vol. 12, No. 4, pp. 149-160, 2009.

W. A. van Dommelen and B. H. Moxness, "Acoustic parameters in speaker height and weight identification: sexspecific behaviour," Language and speech, vol. 38, No. 3, pp. 267-287, 1995.

R. M. Krauss, R. Freyberg, and E. Morsella, "Inferring speakers' physical attributes from their voices," Journal of Experimental Social Psychology, vol. 38, pp. 618-625, 2002.

M. H. Bahari, M. McLaren, D. A. van Leeuwen et al., "Speaker age estimation using i-vectors," Engineering Applications of Artificial Intelligence, vol. 34, pp. 99-108, 2014.

M. Li, K. J. Han, and S. Narayanan, "Automatic speaker age and gender recognition using acoustic and prosodic level information fusion," Computer Speech & Language, vol. 27, No. 1, pp. 151-167, 2013.

T. Ganchev, I. Mporas, and N. Fakotakis, Audio features selection for automatic height estimation from speech. Springer, 2010, pp. 81-90.

J. Gonzalez, "Estimation of speakers' weight and height from speech: A re-analysis of data from multiple studies by lass and colleagues," Perceptual and motor skills, vol. 9.

R. Greisbach, "Estimation of speaker height from formant frequencies," International Journal of Speech Language and the Law, vol. 6, No. 2, pp. 265-277, 2007.

\* cited by examiner

SYSTEMS AND METHODS FOR ESTIMATING AGE OF A SPEAKER BASED ON SPEECH

BACKGROUND

Advances in voice recognition technology have made voice activated and voice controlled technology more common. Mobile phones and in-home devices now include the ability to listen to speech, respond to activation commands, and execute actions based on voice input. Additionally, an increasing number of voice-controlled and interactive devices may be found in public, such as interacting with guests in theme parks. However, current technology does not enable these voice activated and voice controlled devices to properly estimate age of a speaker based on his or her speech.

SUMMARY

The present disclosure is directed to systems and methods for estimating age of a speaker based on speech, substantially as shown in and/or described in connection with at least one of the figures, as set forth more completely in the claims.

DETAILED DESCRIPTION

Figure 1:
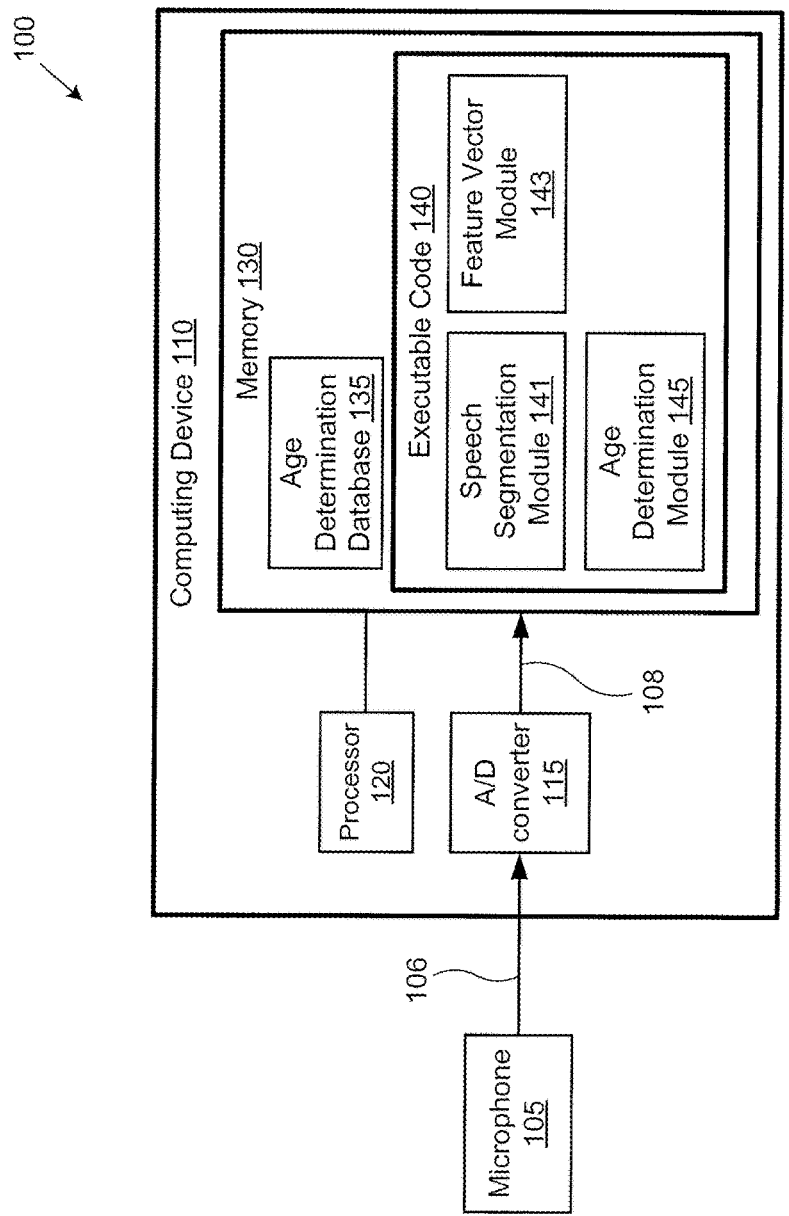
FIG. 1 shows a diagram of an exemplary system for estimating age of a speaker based on speech, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary system for estimating age of a speaker based on speech, according to one implementation of the present disclosure. System 100 includes microphone 105 and computing device 110. Computing device 110 includes analog-to-digital (A/D) converter 115, processor 120, and memory 130. Processor 120 is a hardware processor, such as a central processing unit (CPU) used in computing device 110. Memory 130 is a non-transitory storage device for storing computer code for execution by processor 120, and also storing various data and parameters. As shown in FIG. 1, memory 130 includes age estimation database 135 and executable code 140. Computing device 110 uses microphone 105 to receive input speech from one or more individuals. A/D converter 115 is configured to receive input speech 106 from microphone 105, and convert input speech 106, which is in analog form, to digitized speech 108, which is in digital form.

As shown in FIG. 1, A/D converter 115 is electronically connected to memory 130, such that A/D converter 115 can make digitized speech 108 available to executable code 140 in memory 130. Using A/D converter 115, analog audio signals or input speech 106 may be converted into digital signals or digitized speech 108 to allow executable code 140 to process digitized speech 108 for estimating age of the speaker speaking into microphone 105. Age recognition using speech is typically accomplished by pre-processing digitized speech 108, extracting features from the pre-processed digitized speech, and performing computation and scoring to match extracted features of the pre-processed digitized speech with speech samples in age estimation database 135.

Age estimation database 135 is a database storing various data and parameters that may be used to estimate age of an individual, such as a child based on speech. Age estimation database 135 may be trained on input speech of a plurality of training individuals. In some implementations, the plurality of training individuals may include children, adolescents, and/or adults. In one implementation, age estimation database 135 may include age estimation data based on input speech from a plurality of children. Various phonemes pronounced by individuals of different ages may include distinct and identifiable differences, such as a detectable difference in the resonance of various sounds in the vocal tract of each individual. Children of different ages have different physical characteristics, including height, weight, etc. By recording an input speech including a plurality of phonemes spoken by children of different ages, different physical statures, different weights, etc., and measuring attributes of the various children, certain age estimation characteristics may be identified and recorded in age estimation database 135. In some implementations, age estimation database 135 may include a plurality of age determinant formant-based feature vectors based on one or more age-deterministic phonemes.

During human development, the size and shape of the human vocal tract may change dimensions. As the human vocal tract changes dimensions, the resonant frequencies will change. Thus, the vocal tract of a small child may have different resonant frequencies than the vocal tract of a larger child, and also different resonant frequencies than an adult. As a result of the different resonant frequencies, phonemes spoken by smaller children may have a different formant composition than the same phoneme spoken by a larger child or an adult. In one implementation, age estimation database 135 may be trained on speech by children of various ages. In one implementation, each child's vocal tract may be estimated and phonemes spoken by each child recorded. By observing patterns in the vocal tract dimensions of children at different ages, and recording the phonemes spoken by the children, patterns may become apparent, with the formants of certain phonemes associated with vocal tract development. The patterns of formants in phonemes pronounced by children at different stages of development may reveal certain age-deterministic formant patterns in certain phonemes. In one implementation, age estimation database 135 may store these age-deterministic phonemes and/or feature vectors extracted from a digital speech of the age-deterministic phonemes.

Executable code 140 includes one or more software modules for execution by processor 120 to estimate age of a speaker based on speech. As shown in FIG. 1, executable code 140 includes speech segmentation module 141, feature vector module 143, and age estimation module 145. Speech segmentation module 141 is a software module stored in memory 130 for execution by processor 120 to identify phonemes in digitized speech 108. In some implementations, speech segmentation module 141 may identify boundaries between the plurality of phonemes in digitized speech 108 according to a locus theory of co-articulation, in which each distinct phoneme has a locus, which is an ideal configuration of the vocal tract necessary for its correct enunciation by the speaker. For example, in continuous speech, as one phoneme leads into another, the vocal tract may change shape continuously, moving from the locus of one phoneme to the locus of another phoneme. In some implementations, the vocal tract of the individual speaking the phonemes may not achieve the target loci of successive phonemes. A consequence of this continuous variation is that formant patterns at the extremities of any phoneme vary by the context of the phoneme. In some implementations, speech segmentation module 141 may take measurements from central segments of each phoneme.

Feature vector module 143 is a software module stored in memory 130 for execution by processor 120 to extract feature vectors from digitized speech 108. In some implementations, feature vector module 143 may extract feature vectors from phonemes of digitized speech 108 corresponding to one or more formant-based measurements such as formant positions, formant bandwidth, and/or formant dispersion. In one implementation, the formant dispersion may be defined as the geometrical mean of the formant spacings. In one implementation, feature vector module 143 may continuously extract feature vectors from digitized speech 108. In another implementation, feature vector module 143 may sample digitized speech 108 and extract feature vectors from the sampled portions of digitized speech 108.

Age estimation module 145 is a software module stored in memory 130 for execution by processor 120 to estimate age of a speaker based on digitized speech 108. In some implementations, age estimation module 145 may receive a plurality of formant-based feature vectors from feature vector module 143 and compare each of the formant-based feature vectors with age estimation database 135. In some implementations, age estimation module 145 may identify a match between the plurality of formant-based feature vectors extracted from digitized speech 108. When age estimation module 145 identifies a match in age estimation database 135, age estimation module 145 may estimate that the speaker is likely a certain age, based on the age corresponding to the matching age estimation vector in age estimation database 135.

Figure 2:
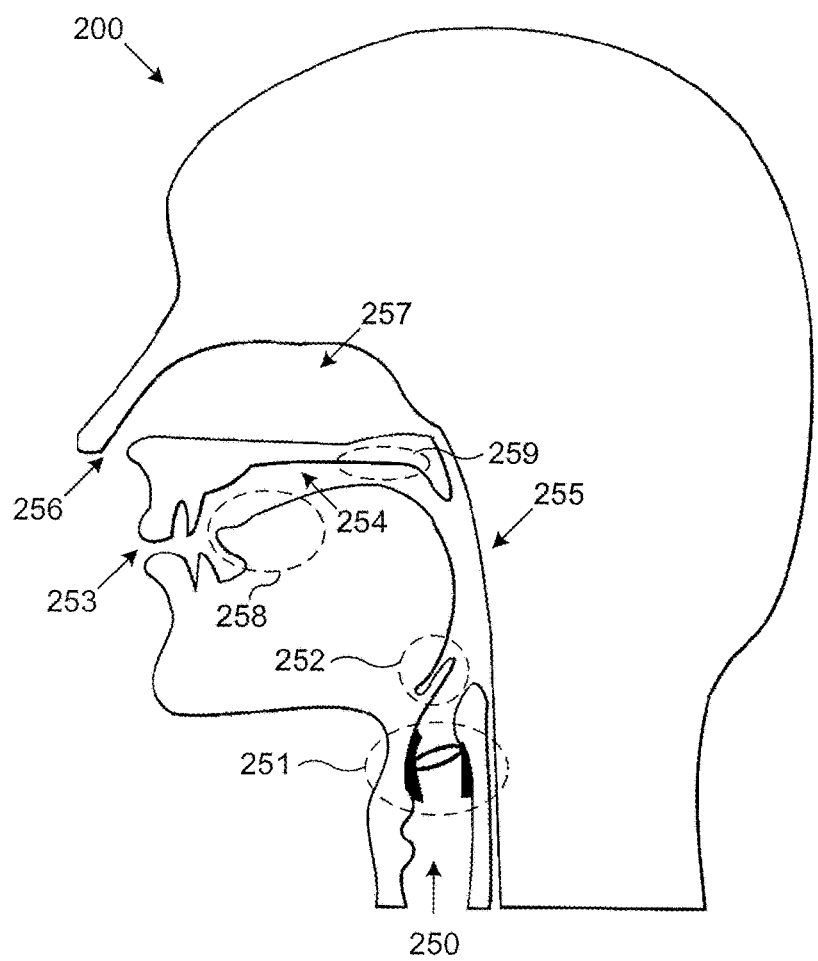
FIG. 2 shows a diagram of an exemplary human vocal tract, according to one implementation of the present disclosure.

FIG. 2 shows a diagram of an exemplary human vocal tract, according to one implementation of the present disclosure. The human vocal tract includes various anatomical structures and various passageways and cavities used in producing sounds. In some implementations, the various sounds produced by the human vocal tract may create phonemes, which may form words of a spoken language. Diagram 200 shows a cross-sectional view of a human head and neck depicting a human vocal tract. In some implementations, air may enter the human vocal tract from the lungs (not shown) through trachea 250. Air flowing out of trachea 250 may pass over vocal cords 251, which may modulate the flow of air being expelled from the lungs while an individual is speaking or pronouncing phonemes. As the air passes from the trachea into pharynx 255, the air passes epiglottis 252, a flap that acts as a valve allowing air into trachea 250 during breathing and directing solids and liquids past trachea 250 to the esophagus during eating and drinking. Pharynx 255 may be the portion of the human vocal tract positioned behind oral cavity 254 and nasal cavity 257 and above epiglottis 252. Air traveling through the human vocal tract may the pass through oral cavity 254, over tongue 258, and exit the mouth opening through lips 253. In some implementations, the dimensions of the human vocal tract may change based on the positioning of tongue 258 and lips 253. In some implementations, air may travel through nasal cavity 257 and exit through nostrils 256. Various parts of the human vocal tract are moveable and/or deformable, and may be referred to as articulators. Articulators may include lips 253, tongue 258, soft pallet 259, the mandible (not shown), etc. Movement of one or more articulators may affect sound that is produced during speech.

Figure 3:
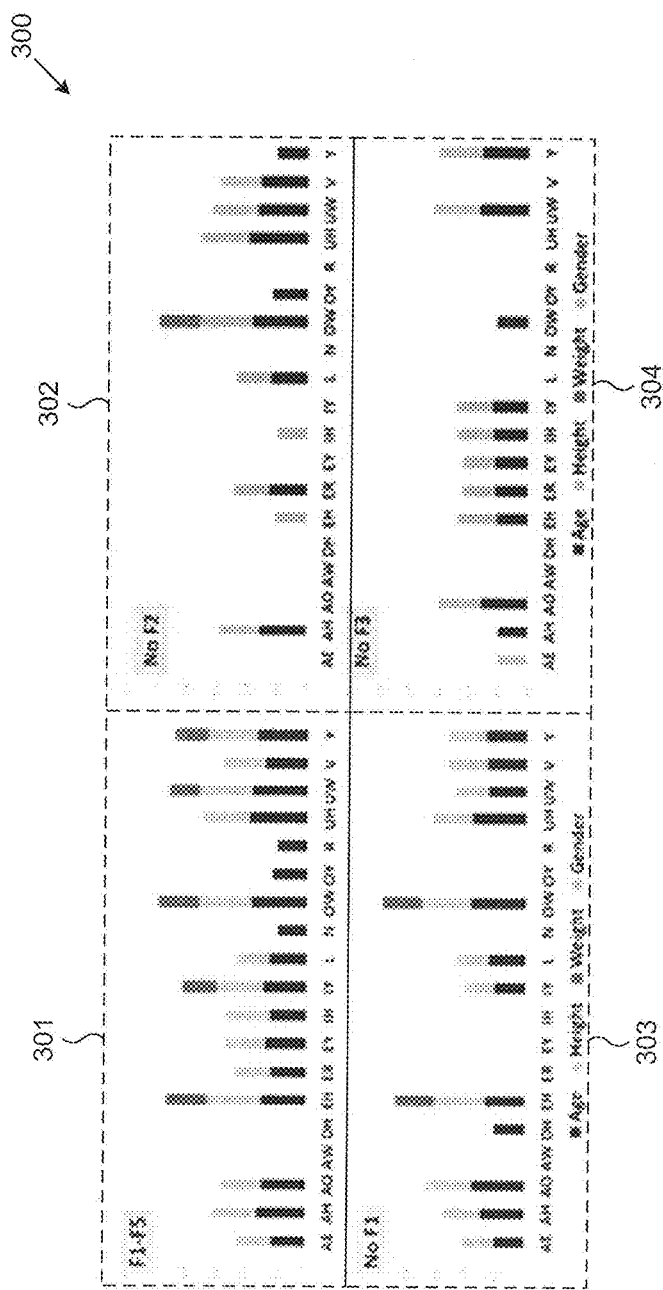
FIG. 3 shows a diagram of an exemplary graph of data related to estimating age of a speaker based on speech, according to one implementation of the present disclosure.

FIG. 3 shows a diagram of an exemplary graph of data related to estimating the age of a speaker based on speech, according to one implementation of the present disclosure. Diagram 300 shows panel 301, panel 302, panel 303, and panel 304. Panel 301 shows a measurement of formants F1-F5 in a plurality of phonemes which may be used as a baseline for making predictions about the age of the individual speaking the phonemes. To isolate the effect of individual formants, executable code 140 may compare the baseline results shown in panel 301 with the predictions obtained by leaving one formant out. Panels 302-304 show the effect of leaving one formant out of the consideration. Panel 302 shows the results of leaving out F2. Panel 303 shows the results of leaving out F1. Panel 304 shows the results of leaving out F3. The difference between the baseline prediction and the prediction without each individual formant may represent the contribution of the left-out formant. In some implementations, the following phonemes did not show any correlations with any of the physical parameters: AA AY B CH D F G HH JH M NG P S SH T TH W Z ZH. FIG. 3 shows the correlations for the remaining phones. In some implementations, among vowel sounds, the ability to predict age significantly reduces when formants F1-F3 are not considered. This may result from the fact that, when learning to disambiguate sounds with progression of age, the child's emphasis is expected to be on F1-F3, which are well known to play pivotal roles in disambiguating sounds.

Another example is that the dimensions of nasal cavity 257 do not change during articulation, only the opening to its passageway is affected. Opening the passageway may result in anti-resonances, which may cancel out some of the formants. For example, nasal sounds other than N are absent from the charts of FIG. 3. In some implementations, F1-F4 may be jointly needed to identify a correlation between age and nasal phonemes. For another example, it is known that formants are often not clearly discernible in fricative sounds such as CH, JH, HH etc. due to the turbulent nature of these sounds. They fail to appear as significant in our analysis for relations with physical parameters as well. Another example is that formants correlate with height as expected. Taller children have longer vocal tracts, and hence lower formants. Another example is that plosive sounds do not show up in charts 301-304. This may be explained by the fact that the central region of plosive sounds is usually in the low-energy transitions between the stop and release phases that define the complete plosive, where the formant peaks are weak or nonexistent.

Figure 4:
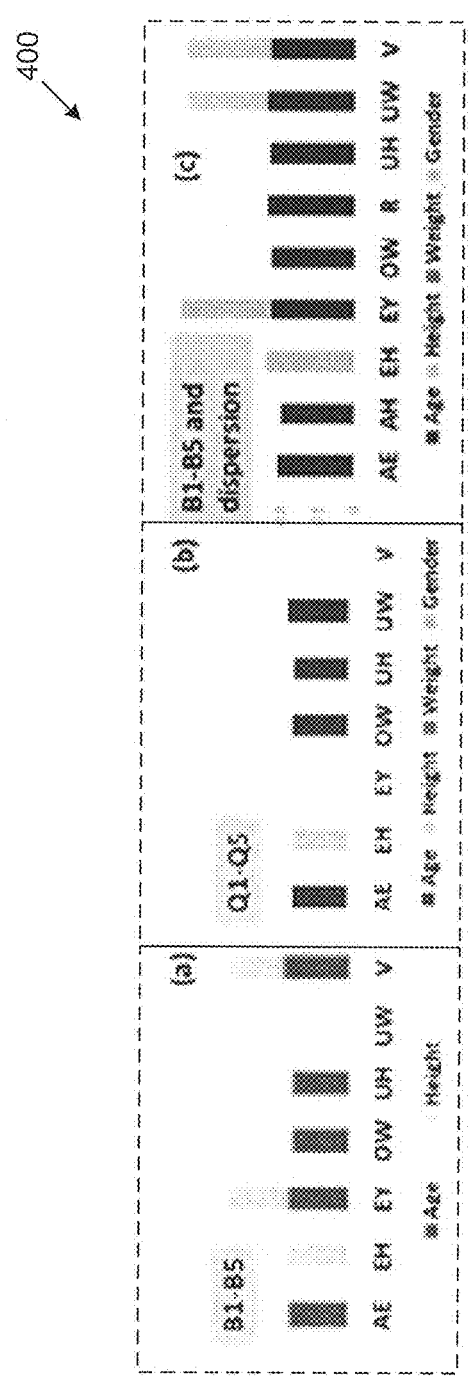
FIG. 4 shows a diagram of an exemplary graph of data related to estimating age of a speaker based on speech, according to one implementation of the present disclosure.

FIG. 4 shows a diagram of an exemplary graph of data related to estimating age of a speaker based on speech, according to one implementation of the present disclosure. Diagram 400 summarizes the results obtained with the formant bandwidths and formant-Q in panel (a) and panel (b), respectively. In some implementations, these measurements may be predictive of age and height for only a small selection of voiced phonemes, which have high-energy spectral peaks. The physiological interpretation of these measurements is unclear. The difference between the performance obtained using B1-B5 alone and B1-B5+ dispersion indicates the contribution of dispersion to the prediction of the parameters. The difference can be seen by comparing panel (c) with panel (a). As in the case of bandwidths and -Q, formant dispersions may be most informative in vowel sounds. For these sounds, dispersion may carry significant information about physical parameters of children as well.

Figure 5:
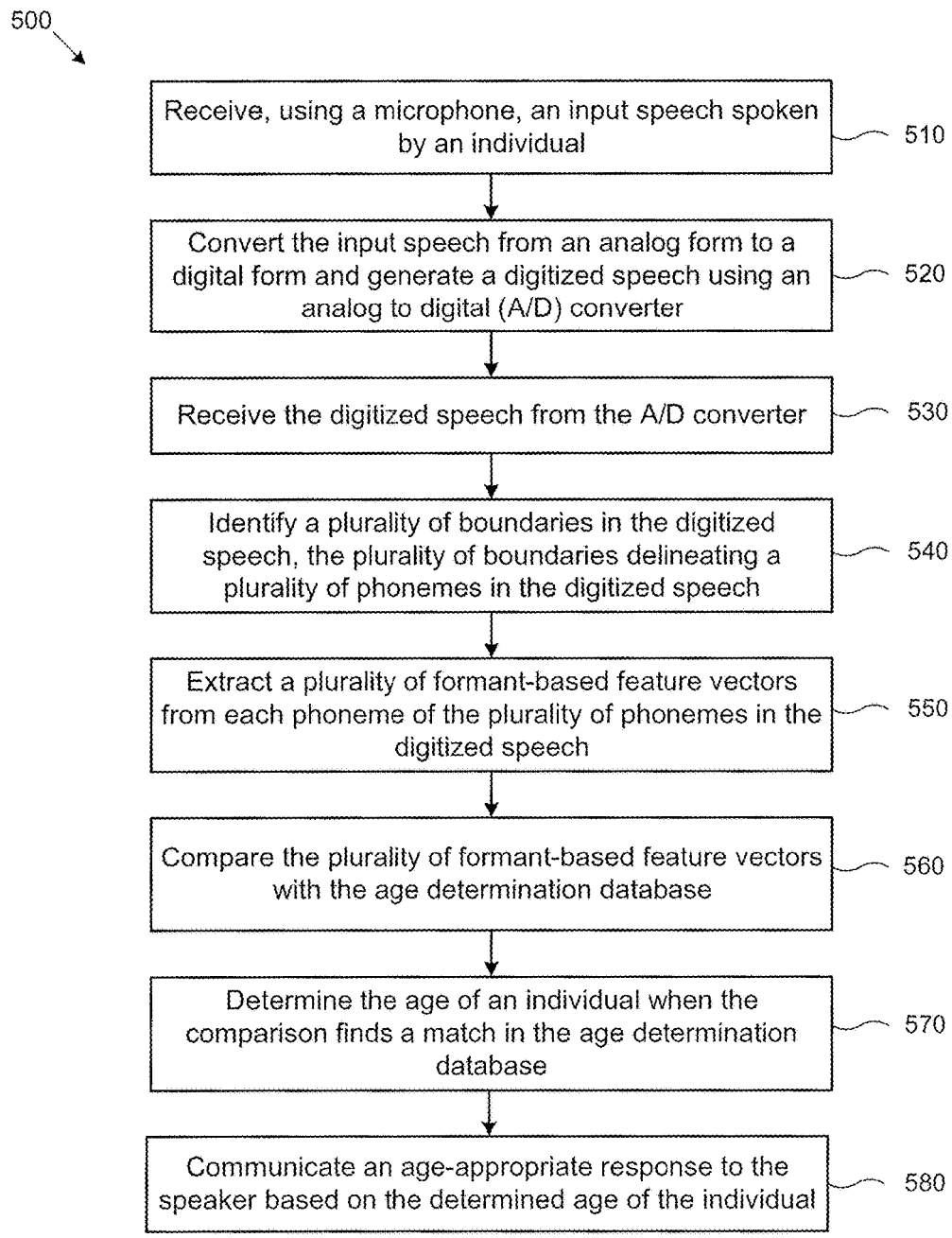
FIG. 5 shows a flowchart illustrating an exemplary method of estimating age of a speaker based on speech, according to one implementation of the present disclosure.

FIG. 5 shows a flowchart illustrating an exemplary method of estimating age of a speaker based on speech, according to one implementation of the present disclosure. Method 500 begins at 510, where system 100, using microphone 105, receives input speech spoken by an individual. In the production of different sounds, the human vocal tract may be shaped into different configurations by the movement of the articulators. Formants are the resonant frequencies of each of these configurations. An individual speaking may change the resonance frequencies by moving their articulators, such as lips 253, jaw (not shown), tongue 258, soft palate 259, etc., and thereby changing the dimensions of the resonance cavities in the vocal tract.

In one implementation, the input speech may include a predetermined sequence of phonemes, such as a predetermined phrase or sentence. For example, an individual may read a sentence, such as an instruction or greeting, and microphone 105 may receive the speech. In other implementations, the input speech may be natural speech, such as conversational speech spoken by an individual and received using microphone 105. Microphone 105 may receive the speech as an analog input and transmit input speech 106 to A/D converter 115. At 520, system 100 uses A/D converter 115 to convert input speech 106 from an analog form to a digital form and generate digitized speech 108. In some implementations, digitized speech signal 108 may be transmitted to executable code 140. Method 500 continues at 530, where executable code 140 receives digitized speech 108 from A/D converter 115.

At 540, executable code 140 identifies a plurality of boundaries in digitized speech 108, the plurality of boundaries delineating a plurality of phonemes in digitized speech 108. In some implementations, speech segmentation module 141 may determine boundaries between formants in digitized speech based on changing frequencies of digitized speech 108, sections of digitized speech having higher amplitude, etc. Speech segmentation module 141 may be trained on individual phonemes and/or phonemes spoken in context of other phonemes. In some implementations, co-articulation may affect boundaries of phonemes spoken in context. At 550, executable code 140 extracts a plurality of formant-based feature vectors from each phoneme of the plurality of phonemes in digitized speech 108 based on at least one of a formant position, a formant bandwidth, and a formant dispersion, wherein the formant dispersion is a geometric mean of the formant spacing. The extraction of feature vectors from within the boundaries of a phoneme can be very difficult in continuous speech. In some implementations, the boundaries of phonemes may not be clear. In addition, the feature vectors may not be consistent from one pronunciation of a phoneme to another pronunciation of the phoneme due to co-articulation effects. According to the widely accepted locus theory of co-articulation, each distinct phoneme has a locus, which may be an ideal configuration of the vocal tract necessary for its correct enunciation by the speaker. In continuous speech, as one phoneme leads into another, the vocal tract changes shape continuously, moving from the locus of one phoneme to another, often not achieving the target loci of successive phonemes. A consequence of this continuous variation may be that formant patterns at the extremities of any phoneme vary by its adjacent phonemic context. In some implementations, the degree of variability can be high. These context-related variations of formant patterns may confuse analyses, and mask the relations between formant features and the speaker's physical parameters.

In order to minimize this confusion, executable code 140 may take all formant related measurements from the central segments of each phoneme, since the central segment may be less affected by context, and may be most representative of the locus of the given phoneme. These segments may be automatically generated by a state-of-art automatic speech recognition (ASR) system trained specifically for generating accurate word, phoneme and state-level segmentations, referring to the states of a Hidden Markov Models (HMMs) used in the ASR system. In some implementations, executable code 140 may train 3-state Bakis Topology HMMs, and use only the segmentations corresponding to the central state to measure the formants. Each formant measurements may be derived from LPC spectral analysis of the speech signal using Burg's method.

Formant position may be the peak frequency of a formant. The formants are numbered by convention—the formant with the lowest frequency is labeled F1, the formant with the second lowest frequency is labeled F2, the formant with the third lowest frequency is labeled F3, the formant with the fourth lowest frequency is labeled F4, and the formant with the fifth lowest frequency is labeled F5. Up to five formants (F1-F5) may be observable in the spectrograms of a child's speech.

Formant bandwidth may be defined as spread of frequencies around any formant within which the spectral energy remains within 3 db of the formant's peak energy. While formant bandwidths are not known to play a role in disambiguating phonemes, they may carry information about the speaker's vocal tract composition, such as the elasticity of the walls, energy dissipation through the glottis, etc., and may be correlated to specific vocal tract configurations that produce phonemes. In some implementations, higher formants may have greater bandwidths.

The Q-factor of a filter may be defined as the ratio of the peak frequency of the filter to its bandwidth. In the source-filter representation of the vocal tract, formants may be considered to be the peak filter frequencies, and the formant-Q may be defined as the ratio of a formant frequency to its bandwidth. Formant-Q's are also thought to be dependent on the speaker characteristics, and may reflect the frequency-dependent characteristics of the speaker's vocal tract.

Formant dispersion may be defined as the average spacing between the formants, and may be indicative of the vocal tract length of the speaker. The conventional definition of formant dispersion is the arithmetic average of the spacing between phonemes. However, this merely captures the spacing between the highest and lowest formant. In some implementations, formant dispersion may be defined as $$D = \sqrt[n-1]{\prod_i F_i - F_{i-1}},$$

which is the geometric mean of the formant spacings.

In some implementations, children's physical characteristics may not be linearly related to acoustic features. Hence, linear regression models, and the direct correlations and R2 values of features that capture linear relationships between predictor and dependent variables, may be unsuitable for estimating the age of a child. Executable code 140 may use an alternate strategy to quantify these relationships. For each physical characteristic, executable code 140 may be trained using a non-parametric regression model for each phoneme that is quantified using the relationship between the acoustic features and the physical parameter through the correlation between the predictions made by the model and true value of the parameter. In some implementations, executable code 140 may use Random Forest (RF) regression, although any known model may be used.

At 560, executable code 140 compares the plurality of formant-based feature vectors with the age determinant formant-based feature vectors of age estimation database 135. Method 500 continues at 570, where executable code 140 estimates the age of the speaker when the comparison finds a match in age estimation database 135. In some implementations, age estimation module 145 may identify vector in age estimation database 135 associated with an age-deterministic phoneme. In such a situation, age estimation module 145 may estimate the speaker speaking into microphone 105 is the age associated with the age-deterministic phoneme. In other implementations, age estimation module 145 may estimate a probability that the individual speaking into microphone 105 is a certain age based on one or more matches found in age estimation database 135. For example, age estimation module 145 may identify more than one match in age estimation database 135, and the plurality of matches may not deterministically indicate one age. In such a situation, age estimation module 145 may create a probability distribution based on the plurality of matches identified and may estimate the age of the speaker is the age having the highest probability associated therewith. In some implementations, age estimation may include a weighted combination of two or more age determinant formant-based feature vectors of the plurality of age determinant formant-based feature vectors.

At 580, executable code 140 communicates an age-appropriate response to the individual based on the estimated age of the speaker. In some implementations, executable code 140 may play an audio to deliver an age-appropriate communication to the individual who spoke the input speech into microphone 105. In other implementations, executable code 140 may play an age-appropriate video clip on a display or other age-appropriate media content to communicate a message to the individual who spoke the input speech.

From the above description, it is manifest that various techniques can be used for implementing the concepts described in the present application without departing from the scope of those concepts. Moreover, while the concepts have been described with specific reference to certain implementations, a person having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
    a microphone configured to receive an input speech from an individual;
    an analog-to-digital (A/D) converter configured to convert the input speech from an analog form to a digital form and generate a digitized speech;
    a memory storing an executable code and an age estimation database including a plurality of age determinant formant-based feature vectors;
    a hardware processor executing the executable code to:
        receive the digitized speech from the A/D converter;
        identify a plurality of boundaries between a plurality of phonemes in the digitized speech;
        extract a plurality of formant-based feature vectors from one or more phonemes of the plurality of phonemes delineated by the plurality of boundaries, based on a formant position, a formant bandwidth, and a formant dispersion, wherein the formant dispersion is a geometric mean of the formant spacing;
        compare the plurality of formant-based feature vectors with the age determinant formant-based feature vectors of the age estimation database;
        estimate the age of the individual when the comparison finds a match in the age estimation database; and
        communicate an age-appropriate response to the individual based on the estimated age of the individual.

2. The system of claim 1, wherein estimating the age of the individual includes a weighted combination of two or more age determinant formant-based feature vectors of the plurality of age determinant formant-based feature vectors.

3. The system of claim 1, wherein the input speech is one of a predetermined sequence of phonemes and natural speech.

4. The system of claim 1, wherein the age determinant formant-based feature vectors of the age estimation database include a plurality of formant-based feature vectors corresponding to a plurality of most predictive phonemes, wherein each of the plurality of most predictive phonemes corresponds to a different age.

5. The system of claim 1, wherein the digitized speech includes at least one of a silence and a filled pause.

6. The system of claim 1, wherein the input speech includes a plurality of formants where each formant of the plurality of formants is a resonance of a vocal tract of the individual.

7. The system of claim 1, wherein the input speech is one of English and a language that is not English.

8. The system of claim 1, wherein the age of the individual is estimated probabilistically.

9. A method for use with a system having a microphone, an analog-to-digital (A/D) converter, a memory storing an executable code, and a hardware processor, the method comprising:
    receiving, using the hardware processor, a digitized speech from the A/D converter;
    identifying, using the hardware processor, a plurality of boundaries between a plurality of phonemes in the digitized speech;
    extracting, using the hardware processor, a plurality of formant-based feature vectors from one or more phonemes of the plurality of phonemes delineated by the plurality of boundaries, based on a formant position, a formant bandwidth, and a formant dispersion, wherein the formant dispersion is a geometric mean of the formant spacing;

comparing, using the hardware processor, the plurality of formant-based feature vectors with the age determinant formant-based feature vectors of the age estimation database;

estimating, using the hardware processor, the age of the individual when the comparison finds a match in the age estimation database; and communicating, using the hardware processor, an age-appropriate response to the individual based on the estimated age of the individual.

10. The method of claim 9, wherein estimating the age of the individual includes a weighted combination of two or more age determinant formant-based feature vectors of the plurality of age determinant formant-based feature vectors.

11. The method of claim 9, wherein the input speech is one of a predetermined sequence of phonemes and natural speech.

12. The method of claim 9, wherein the age determinant formant-based feature vectors of the age estimation database include a plurality of formant-based feature vectors corresponding to a plurality of most predictive phonemes, wherein each of the plurality of most predictive phonemes corresponds to a different age.

13. The method of claim 9, wherein the digitized speech includes at least one of a silence and a filled pause.

14. The method of claim 9, wherein the input speech includes a plurality of formants where each formant of the plurality of formants is a resonance of a vocal tract of the individual.

15. The method of claim 9, wherein the input speech is one of English and a language that is not English.

16. The method of claim 9, wherein the age of the individual is estimated probabilistically.

17. The system of claim 1, wherein prior to the extracting of the plurality of formant-based feature vectors, the hardware processor executes the executable code to identify a segment of one or more phonemes of the plurality of phonemes delineated by the plurality of boundaries, and wherein the extracting extracts the plurality of formant-based feature vectors from the identified segment of the one or more phonemes of the plurality of phonemes delineated by the plurality of boundaries.

18. The method of claim 9, wherein prior to the extracting of the plurality of formant-based feature vectors, the method further comprises:

identifying a segment of one or more phonemes of the plurality of phonemes delineated by the plurality of boundaries;

wherein the extracting extracts the plurality of formant-based feature vectors from the identified segment of the one or more phonemes of the plurality of phonemes delineated by the plurality of boundaries.

\* \* \* \* \*